United States Patent [19]
Bilski

[11] 3,791,657
[45] Feb. 12, 1974

[54] DYNAMIC LIP SEAL

[75] Inventor: Richard E. Bilski, Erie, Pa.

[73] Assignee: General Electric Company, Erie, Pa.

[22] Filed: Apr. 27, 1972

[21] Appl. No.: 248,152

[52] U.S. Cl. .................. 277/53, 277/58, 277/133
[51] Int. Cl. ..................... F16j 15/42, F16j 15/44
[58] Field of Search ....... 277/25, 13, 14, 53, 58, 65, 277/67, 133, 134, 24

[56] References Cited
UNITED STATES PATENTS

| | | | |
|---|---|---|---|
| 2,266,407 | 12/1941 | Bruestle | 277/67 |
| 3,097,854 | 7/1963 | Kaiser | 277/24 |
| 3,292,847 | 12/1966 | Herrick | 277/67 |
| 3,468,548 | 9/1969 | Webb | 277/13 |
| 2,573,425 | 10/1951 | Fletcher | 277/13 |

FOREIGN PATENTS OR APPLICATIONS

| | | | |
|---|---|---|---|
| 452,314 | 8/1936 | Great Britain | 277/67 |

Primary Examiner—William T. Dixson, Jr.
Assistant Examiner—Robert I. Smith
Attorney, Agent, or Firm—Dana F. Bigelow; Walter C. Bernkopf

[57] ABSTRACT

An annular L-shaped seal member spacially surrounding a rotatable shaft collar, the seal having an axial portion contiguous with the shaft collar periphery to form an axial labyrinth for fluid flow from a higher pressure side to a lower pressure side of the collar, and an integral radial portion axially displaced on the low pressure side of the collar to form a radially inward extension of the fluid flow channel to impede the fluid flow therethrough by the centrifuge of fluid undergoing viscous shear during rotation of the collar.

4 Claims, 4 Drawing Figures

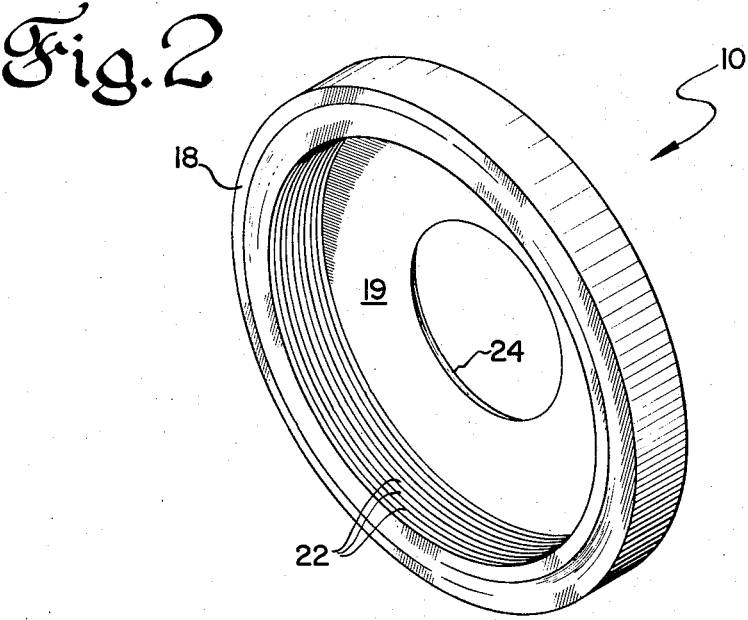
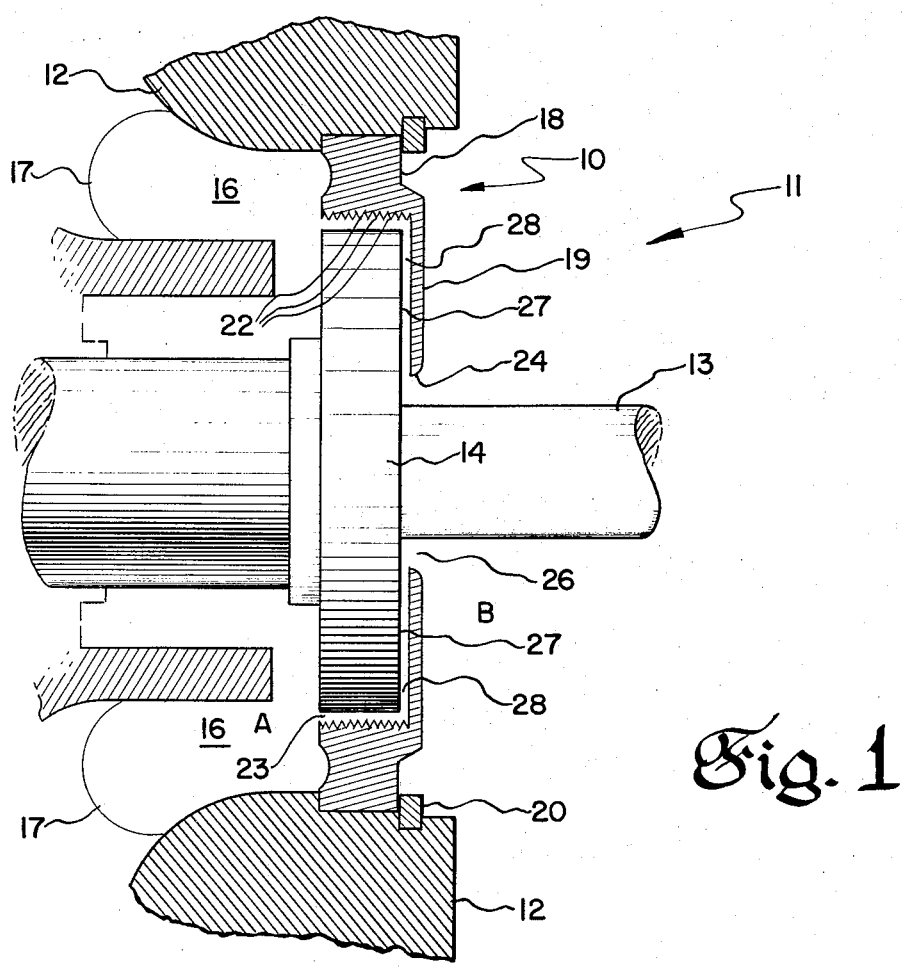

DYNAMIC LIP SEAL

BACKGROUND OF THE INVENTION

This invention relates generally to seals for rotating machinery and more particularly to seals of the labyrinth type wherein fluid pressure is utilized to perform a sealing function.

Seals of the conventional types, such as that of the felt seal and the carbon-rubbing types, depend for their utility and wear-life on the precision, lubrication, and relative speed of the cooperating parts. Lubrication is often provided by the subject of the seal, the liquid being restrained in a confined chamber. At very high speeds, however, such a lubrication system may be insufficient, resulting in the heating and eventual failure of the seal.

A further complication is that of dimensional changes brought about in high temperature rotating machinery such as steam turbines and turbochargers. A large temperature increase and consequent expansion of parts may reduce to an undesirable degree the tolerance between the seal and the moving part.

These and other considerations lead to the development of the labyrinth seal, now well known in the art, wherein a stationary annular ring member is disposed around a rotatable shaft collar, with the ring member carrying teeth along its axial profile for minimal contact with the periphery of the rotating body. Such a device allows a liquid to be restrained in a confined chamber on one side thereof, even though the seal teeth may not even contact the periphery of the rotating body. Rotation of the shaft collar causes the liquid to be centrifuged outwardly toward the ring member to form a liquid sealing condition, whereas the labyrinth teeth prevent the axial flow of the fluid. The liquid will tend to be restrained unless an appreciable pressure gradient exists across the axial limits of the labyrinth. If it does exist, then restraint can be accomplished by increasing the axial length of the labyrinth or by decreasing the radial clearance between the teeth members and the rotating body, neither of which are desirable, however, the first for reasons of dimensional allowances and the latter for reasons of frictional wear.

It is, therefore, an object of this invention to provide an improved labyrinth seal device.

Another object of this invention is the provision for a frictionless seal for use across a pressure gradient.

A further object of this invention is the provision for increasing the effectiveness of a labyrinth seal without exceeding dimensional allowances thereof.

Still another object of this invention is the provision for a fluid seal arrangement which is useful with high-speed, high-temperature rotating machinery.

Yet another object of this invention is the provision for a seal device which requires no special adaptations by its associated machine parts.

These objects and other features and advantages become more readily apparent upon reference to the following description when taken in conjunction with the appended drawings.

SUMMARY OF THE INVENTION

This invention is a modification to the conventional labyrinth seal across which a pressure gradient may exist. A stationary annular member spacially surrounding a rotating collar as in a conventional labyrinth seal, has extending radially inward from its one end, an annular seal lip which forms an open-ended fluid flow channel between it and the outer end of the shaft collar. Fluid communicates from the chamber at the inner end of the shaft collar, along an axial labyrinth path of the conventional seal portion and into the open-ended fluid flow channel. The adverse pressure gradient which would cause the fluid to leak out the channel is overcome by the rotation of the collar relative to the seal, wherein the rotation causes the fluid within the channel to undergo viscous shear setting up a centrifugal force to off-set the radially inward outward leakage flow.

In the drawings, as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a partial side sectional view of a rotational machine to which the invention has been applied.

FIG. 2 is a perspective view of the seal in the preferred embodiment of the invention.

DESCRIPTION OF THE PREFERRED EMBODIMENT

Figure 3:
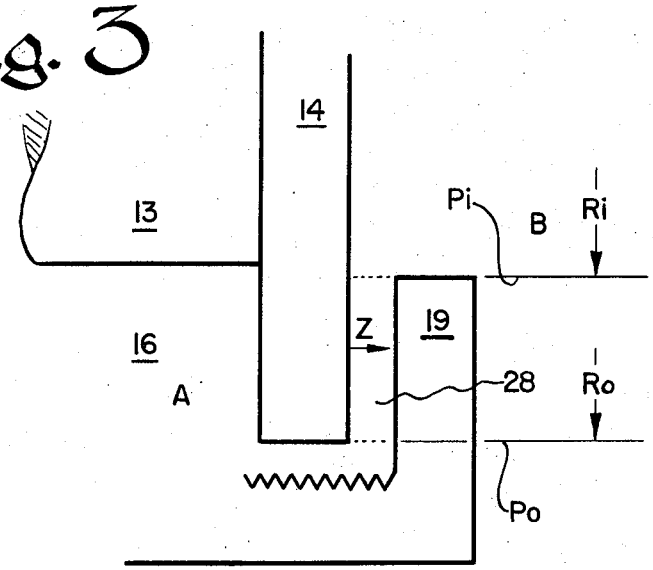
FIG. 3 is a schematic diagram of the seal with representative dimensions assigned.

Reference is now made to FIG. 1 wherein the seal of the subject invention is shown at 10, as used in combination with a typical rotating machine 11 having a housing 12, in which is bearing-mounted a rotatable shaft 13 and an integral rotating shaft collar 14. On one side of the shaft collar is a chamber 16 for containing a fluid 17, as for example, lubrication oil. The seal 10 is interposed between the housing 12 and collar 14 for purposes of confining the fluid to the chamber while allowing the shaft and its associated collar to rotate in the housing. An adverse negative pressure gradient may exist from the region A inside the chamber 16 to the region B on the opposite side of the seal 10. For example, a typical rotating machine for which the seal is adapted to be used is a turbocharger, wherein at higher operational speeds, compressed air is introduced from an outside source into region B to offset the adverse pressure gradient that would normally exist. However, at lower speeds, such as when idling, the air is not available, and the pressure gradient that exists is sufficient to force the fluid 17 to leak into region B. A conventional labyrinth seal will not prevent this from happening, but if modified in accordance with the present invention, fluid leakage can be controlled.

One embodiment of the seal 10 is shown in FIGS. 1 and 2, wherein it comprises an L-shaped annular member having an axial leg 18 and an integral radial leg 19. The axial leg 18 is interposed between the housing 12, with which it is in close fit relation, and the shaft collar 14, with which it is in minimal clearance relation. Security of the seal is accomplished by means of retaining rings 20, or the like. The annular surface surrounding the shaft collar has a plurality of teeth 22 which define an axial, labyrinth, fluid-flow channel 23. Minimal contact may exist between the teeth 22 and collar 14, but a radially spaced relationship as shown in FIG. 1 is preferred for high-speed rotation machinery. During rotation of the shaft collar 14, fluid in the fluid-flow channel is centrifuged outwardly to provide a fluid seal therein. An adverse pressure gradient thereacross, however, will cause the axial flow of fluid 17 in the fluid flow channel 23, and in particular, a low-pressure condition in region B will cause fluid to flow from the chamber 16.

At the outer end of the leg 18 is integrally attached the radial leg 19 which extends radially inward to the annular lip 24. A passage 26 exists for extension of the shaft 13 therethrough. The radial length of the leg 19 is dependent on a number of factors, including geometric requirements, shaft speed of operation, and pressure gradient between regions A and B. As can be seen in FIG. 1 the leg 18 extends axially beyond the shaft collar outer surface 27 so as to axially displace the leg 19 therefrom and so define a radial, open-ended fluid flow channel 28. This channel communicates with and forms an extension of the axial fluid-flow channel 23, thereby effectively lengthening it for a more effective sealing condition. The axial thickness of the leg 18 is a minimum so as not to occupy any more space than is necessary. This is an important design consideration where high efficiency is desired and conditions of limited space exist, as for example, where a turbine wheel (not shown) is mounted on the shaft 13 in close proximity to the collar. The relatively thin walled seal leg 19 thus provides for sufficient sealing without the need of a bulky extended sleeve surrounding the shaft 13. As a consequence the shaft 13 is relatively unimpeded in its rotation since the passage 26 may offer a maximum clearance between the seal and the shaft.

Functionally, during rotation of the collar 14, a viscous shear of the fluid produces centrifugal forces thereon which opposes fluid leakage out of the open-ended channel 28. As will be shown hereinafter, the axial length of the channel 28 is not functionally limited, but as a practical design consideration, it should be maintained at a minimum. However, the width must be sufficiently great to allow for dimensional changes resulting from temperature differences in the machinery, since any contact between the collar surface 27 and the inner surface of the leg 19 is to be avoided for the reason of undesired friction. Under proper design conditions the centrifugal force produced by the viscous shear will overcome the adverse pressure gradient and prevent leakage flow of the fluid. The effective length of the seal oil passage is greatly increased by adding only a small amount of axial length to the seal to accommodate the radial leg 19. Construction of the seal is of a rigid material such as bronze, or the like.

As stated hereinbefore, the attainment of an adequate sealing condition while providing for a minimum of friction, requires that proper design considerations be made to accommodate the desired pressure drop across the shaft collar at a given rotational speed thereof. Based on an assumption of no leakage flow, the design relationships of the liquid seal interposed between the collar 14 and leg 19 may be expressed by the equation:

$P_o - P_i = cw^2/2g_c [1 - (Z/h)(2 - Z/h)](R_o^2 - R_i^2)$ wherein FIG. 3:
$P_o$ = pressure at radius $R_o$
$P_i$ = pressure at radius $R_i$
$R_o$ = outside radius of liquid seal (radius of collar)
$R_i$ = inside radius of liquid seal
$C$ = fluid density
$W$ = rotational speed of collar
$g_c$ = dimensional constant
$h$ = seal axial clearance
$Z$ = axial distance from surface of rotating collar towards stationary seal It should be noted that the pressure gradient within the space bounded by the collar and the seal has a two dimensional profile varying both radially and axially. Considering the radial coordinate, the pressure drop thereacross varies in relation to the function $(R_o^2 - R^{i2})$ with the pressure rise $P_o - P_i$ becoming smaller as the difference between the two radial dimensions $R_o$ and $R_i$ becomes smaller until, at the limit when $R_i = R_o$, the pressure rise is zero. When $R_o$ is greater than $R_i$ the maximum pressure will be at $R_o$ with the pressure at $R_i$ equal to the pressure in region B. As the pressure in area A is increased in relation to that of area B, leakage will tend to increase and the radial length of the seal will increase to a point wherein equilibrium will be established, with a maximum length being equal to the length of the leg 19.

Ignoring for the moment the function of the equation in which the axial distances are contained, and assuming that the effect of the labyrinth seal is negligible as compared with that of the liquid seal, the following relationship can be set forth:

$P_{16} - P_i \alpha CW^2/2g [R_o^2 - R_i^2]$

Thus if $R_i$ and $R_o$ are known, the threshold speed of collar rotation can be determined. Similarly, if the speed $W$ is fixed, then the size of the seal can be determined by solving for the quantity $[R_o^2 - R_i^2]$.

Figure 4:
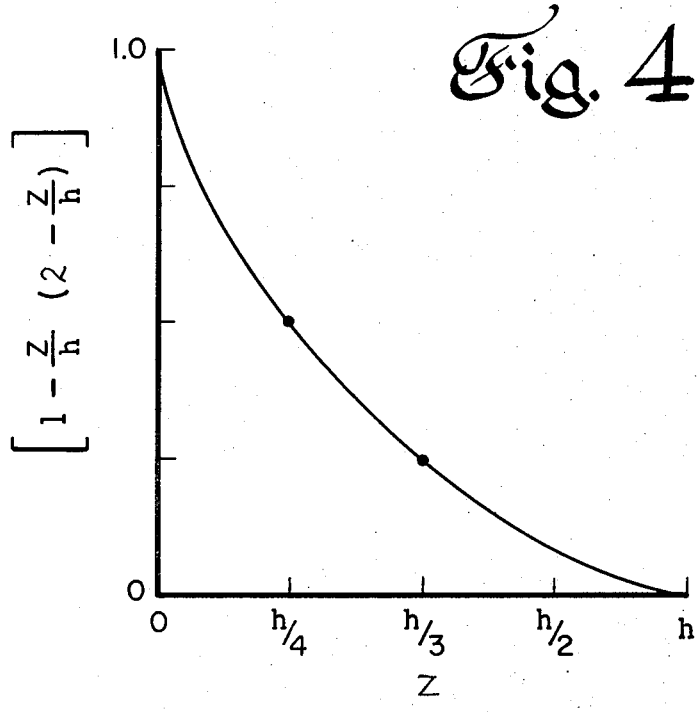
FIG. 4 is a graphic illustration of the pressure gradient of the subject seal as a function of axial distance.

Referring to the axial coordinate of the liquid seal pressure gradient, the pressure brought about by the centrifugal force is greatest at the surface of the collar ($Z=0$) and has a zero value when $Z=h$, at the surface of the stationary seal. Plotted as a function of Z, the graph of FIG. 4 is obtained, which shows that under the assumption of no leakage flow from the seal, the axial clearance is not an important parameter. No matter what the value of h is chosen to be, the function will always vary from 0 to 1.0 in the manner shown in FIG. 4. As a practical matter, however, h should be as small as possible consistent with the required tolerances.

Based on the formula and graph of FIG. 4 it might appear that leakage will occur at the seal surface. However, leakage will not necessarily occur when a negative pressure gradient exists. This is because, if leakage were to occur, fluid to maintain a leakage rate would have to come from region A. But if the seal is working properly the radial pressure gradient at the rotating shaft collar ($Z=0$) would be such that no axial flow through channel 23 would be possible and hence no leakage flow rate could be maintained and leakage at the nonrotating seal surface is not possible. Suffice it to say, that if leakage does occur as a result of an adverse negative pressure gradient, it will first occur within a flow path contiguous with the mechanical seal surface.

Empiracle results have shown that leakage can be controlled by varying the radial length $R_o - R_i$, the rotational speed W of the collar or the axial distance H. The latter, then, does become a factor when we do not assume a condition of no leakage, in which case the relationship is expressed by another equation. The collar speed and radial dimensions of the mechanical seal, however, are considered to be more critical with respect to design performance characteristics.

What I claim as new and desire to secure by Letters Patent of the United States are:

1. An annular seal of the type interposed between a housing and a rotatable shaft collar, the collar having a negative pressure gradient between its inner and outer sides and having on the inner side thereof a viscous fluid tending to flow axially over the periphery of the collar toward the collar outer side, wherein the seal comprises:

an annular L-shaped stationary member having an axial leg surrounding the periphery of the collar, in close proximity therewith so as to form an axial fluid-flow impeding channel between the collar periphery and the axial leg; and an integral radial leg axially displaced from the shaft collar outer side and extending radially inwardly toward the shaft to form an open-ended extension of said fluid-flow impeding channel, wherein rotation of the shaft causes the fluid to undergo viscous shear and centrifuge the fluid radially outward to oppose the fluid flow in said channel and thereby overcome the adverse pressure gradient across the shaft collar to prevent fluid leakage.

2. An annular seal as set forth in claim 1 wherein said axial leg has on its inner periphery a plurality of labyrinth teeth to further impede the axial flow of fluid in said fluid flow channel.

3. An annular seal as set forth in claim 1 wherein the pressure difference between a point at the inner radius and that at the outer radius of the fluid in said open-ended extension is expressed by the equation:

$$P_o - P_i = CW^2/2g_c [1-Z/h(2-Z/h)] [R_o^2 - R_i^2]$$

wherein $P_o$ = pressure at outer radius
$P_i$ = pressure at inner radius
$C$ = fluid density
$W$ = rotational speed of shaft collar
$g_c$ = dimensional constant
$Z$ = axial distance from surface of shaft collar towards stationary seal
$h$ = axial clearance between shaft collar and seal radial leg
$R_o$ = outside radius of liquid seal
$R_i$ = inside radius of liquid seal 4. An annular seal as set forth in claim 1 wherein said radial leg is of minimum axial thickness so as not to substantially extend axially along the shaft outwardly from said collar outer side.

* * * * *